(12) United States Patent
Noel et al.

(10) Patent No.: US 6,502,041 B1
(45) Date of Patent: Dec. 31, 2002

(54) METHOD FOR CONTROLLING TAPER PIPE THREAD AND CORRESPONDING CONTROL DEVICES

(75) Inventors: Thierry Noel, Sebourg (FR); Gilles Assens, Colmar (FR)

(73) Assignee: Vallourec Mannesmann Oil & Gas France, Aulnoye-Aymeries (FR)

(*) Notice: Subject to any disclaimer, the term of this patent is extended or adjusted under 35 U.S.C. 154(b) by 0 days.

(21) Appl. No.: 09/674,009

(22) PCT Filed: Feb. 17, 2000

(86) PCT No.: PCT/FR00/00395
§ 371 (c)(1),
(2), (4) Date: Jan. 24, 2001

(87) PCT Pub. No.: WO00/50840
PCT Pub. Date: Aug. 31, 2000

(30) Foreign Application Priority Data

Feb. 24, 1999 (FR) .............................................. 99 02526

(51) Int. Cl.$^7$ .................................................. G01B 3/56
(52) U.S. Cl. ......................................... 702/33; 702/150
(58) Field of Search .......................... 33/147, 199, 501, 33/501.7, 504, 829; 73/761, 865.8; 285/94, 333; 364/560; 702/33

(56) References Cited

U.S. PATENT DOCUMENTS

| | | | | |
|---|---|---|---|---|
| 3,879,854 A | * | 4/1975 | Johnson | 33/199 R |
| 4,672,750 A | * | 6/1987 | Storace et al. | 33/199 R |
| 4,964,305 A | * | 10/1990 | Raulins | 73/761 |
| 5,170,306 A | * | 12/1992 | Gomes | 364/560 |

* cited by examiner

Primary Examiner—John S. Hilten
Assistant Examiner—Douglas N Washburn
(74) Attorney, Agent, or Firm—Oblon, Spivak, McClelland, Maier & Neustadt, P.C.

(57) ABSTRACT

A method for the inspection of male or female tapered threads located at the extremities of metal pipes. The pitch diameter of the threads in a measuring plane located substantially in the middle of a zone of perfect threads is inspected using a plane diameter measuring device while the pitch diameter of the threads is conventionally defined by the specification API 5B in the plane of the last perfect male thread. The pitch diameter of the threads measured is compared with an estimated value calculated from the nominal value of the pitch diameter in the plane $P_0$, from the distance between $P_0$ and $P_1$, and a plot value for the taper, itself a function of the distribution of the tapers formed.

21 Claims, 5 Drawing Sheets

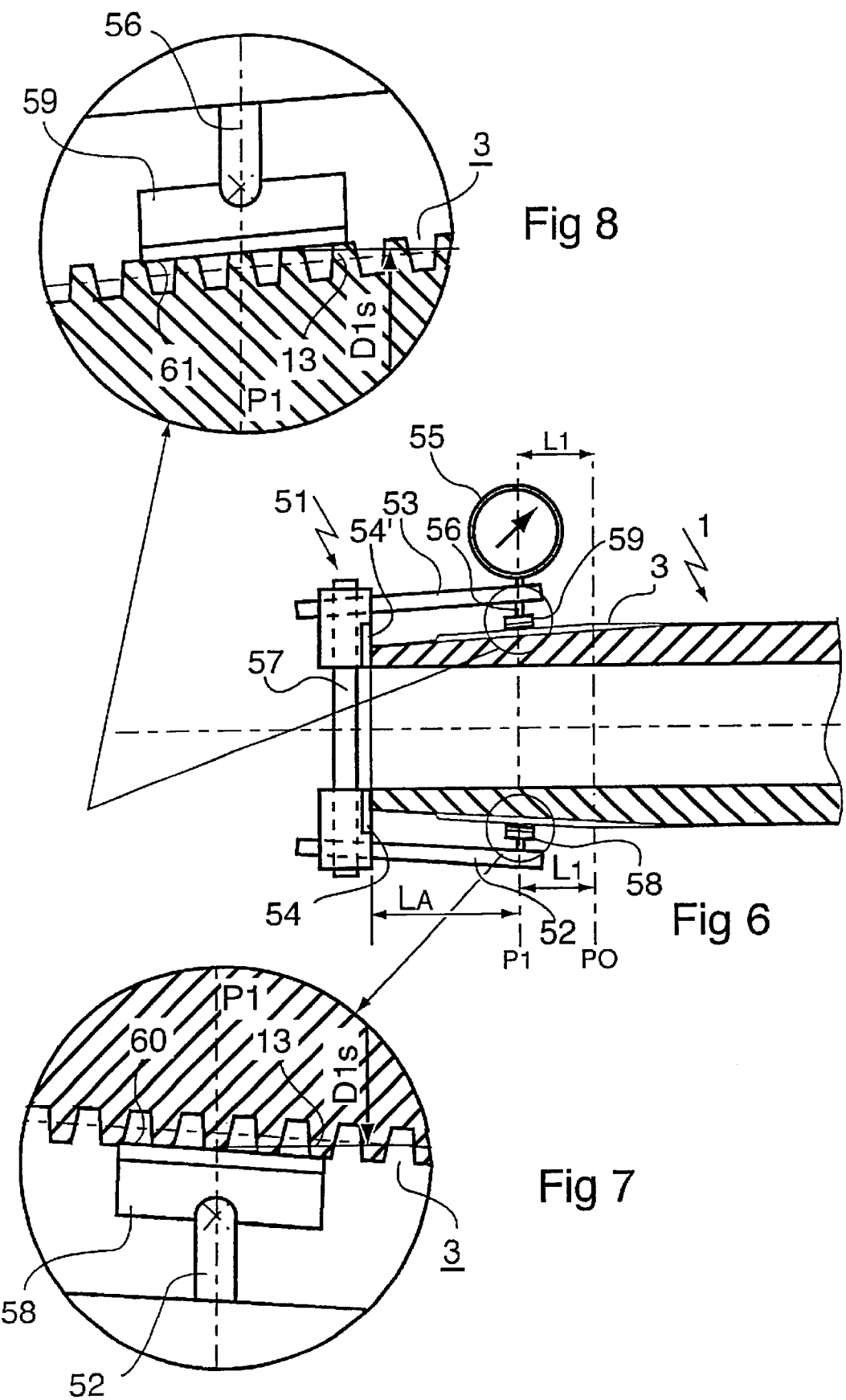

METHOD FOR CONTROLLING TAPER PIPE THREAD AND CORRESPONDING CONTROL DEVICES

BACKGROUND OF THE INVENTION

1. Field of the Invention

The present invention relates to a method for inspecting the dimensions of a male or female tapered thread located on the periphery of a male or female tubular element itself located at the end of a metal pipe, more particularly to a process for inspecting the dimensions of the pitch diameter of such a male or female tapered thread in a given cross-sectional plane and inspection devices for carrying out the method.

DISCUSSION OF THE BACKGROUND

The term "pitch diameter" of a thread means the diameter taken on the flank of the male thread at the thread half-height. The female thread is defined with respect to the male thread.

For a tapered thread, the nominal value of the pitch diameter must be defined in a given cross-sectional plane.

Threaded connections for metal pipes are known which are in particular used to constitute drilling, production tubing or casing pipes for hydrocarbon wells or mine wells, the connection being made between a male element and a female element located at the pipe end and each respectively provided with a male and female tapered thread located respectively on the external or internal periphery of the male or female element.

The term "pipe" as used here means any type of pipe, not simply a long pipe but also a short tubular element forming, for example, a coupling and enabling two long pipes to be associated together.

Specification API 5CT from the American Petroleum Institute (API), which constitutes a world-wide standard in the hydrocarbon extraction industry, specifies pipes coupled using such threaded connections comprising tapered threaded portions with triangular, round or trapezoidal threads.

Specification API 5B, also from the API, specifies the corresponding thread and a method for inspecting it.

Specification API 5B specifically mentions, for each pipe dimension, the value of the thread nominal pitch diameter in a cross-sectional plane located at the end of the perfect male threads on the pipe body side, male threads exceeding this plane having an incomplete height and fading out.

In the remainder of the present document, this plane is termed the "reference plane of the pitch diameter", abbreviated to "reference plane". The term "first thread" relates to the side of the threaded portion directed towards the free end of the corresponding male or female element; the term "last thread" refers to the side of the threaded portion oppositely directed to the free end of the corresponding element.

The last perfect male thread is thus located in the reference plane while the last male thread corresponds to the end of the threaded portion on the pipe body side.

Threads produced in accordance with API 5B must be inspected by hand tightening of gauges such as ring gauges comprising an internal thread in the case of inspecting male threads or plug gauges comprising an external thread in the case of inspecting female threads.

The relative axial position when the gauge has been screwed on is checked with respect to the inspected thread and specification API 5B defines a value and a tolerance for this relative axial position.

The inspection method specified by API 5B has advantages, namely simple and rapid global inspection of the thread, but it also has a number of economical and technical disadvantages.

Firstly, for each thread diameter to be inspected, the hard gauge inspection method requires sets of gauges for different levels, namely master gauges and secondary or working gauges, the working gauges having to be discarded when the wear on them exceeds a critical value.

This means that an extremely large number of high precision gauges have to be made and they have to be managed depending on their state of wear; thus costs are high.

That thread inspection method provides a global result which depends on a number of parameters including the pitch diameter and also the taper and ovality, which parameters interact and thus do not facilitate fine interpretation of the inspection results.

Thus when inspecting a male thread, if the taper of the male thread to be inspected is less than that of the gauge, the first roots of the male threads are in contact with the gauge threads while the last roots of the male threads have a radial clearance with respect to the corresponding threads of the gauge. In contrast, if the taper of the male thread to be inspected is higher than that of the gauge, the roots of the last male threads are in contact with the threads of the gauge but not the roots of the first threads.

In both cases, the pitch diameter of the male thread in the corresponding plane on the gauge in the reference plane is less than the nominal pitch diameter but, in addition in the second case, the pitch diameter at the first male threads is not accurately known.

Similarly, in the case of inspecting a female thread, when the taper of the female thread to be inspected is less than or greater than that of the gauge, the pitch diameter of the female thread in the corresponding plane on the gauge to the reference plane is higher than the nominal pitch diameter but, if is its lower, the pitch diameter at the first male threads is not accurately known.

The manufacturers of particular threaded connections such as the connections described in European patent EP-A-0 488 912, which are known to have service performances which are superior to those of API connections, have been forced to use inspection methods similar to those specified for API connections because of international recognition and imposition of API specifications.

The cost of implementing those methods is considerable; the manufacturer must have available complete sets of gauges for itself and for sub-contractors.

Thread inspection methods have thus been developed which do not use hard gauges but which carry out a direct determination of the pitch diameter in the reference plane or at another set position.

United States patent U.S. Pat. No. 4,524,524 describes a method and a device for direct inspection of the pitch diameter of a horizontally disposed male or female thread in which:

The device comprises an upper contact surface and a lower contact surface located in a vertical plane at an adjustable horizontal distance from a vertical bearing surface;

The vertical distance between the upper and lower contact surfaces are adjusted to a pre-determined value;

The device is placed such that the vertical bearing surface bears against the end of the element the thread of which is to be inspected and such that the two contact surfaces are in contact with the thread crests at diametrically opposed points on the thread;

The difference in distance between these two contact surfaces is measured with respect to the pre-determined value using a comparator, for example, which has been zeroed to the predetermined value.

The pre-determined value in this case corresponds to the nominal value of the diameter between the thread crests and thus to the nominal value of the pitch diameter increased or reduced by the height of one thread depending on whether a male or female thread is being inspected.

The instructions for the device sold by the proprietor of U.S. Pat. No. 4,524,524 defines:
a) the required relation for establishing the link between the tolerance in the pitch diameter ($\Delta D$) when using the inspection method using the measurement of the pitch diameter and the tolerance in the axial position ($\Delta S$) of the hard gauge as defined by specification API 5B:

$$\Delta D = \Delta S \cdot TT_{nom}/100$$

$TT_{nom}$ being the thread nominal taper in % with respect to the diameter;
b) fine corrections for accounting for the influence of the geometry of the contact surfaces of the inspection device on the pre-determined value of the vertical distance between the contact surfaces;
c) the method for determining the pre-determined value of the vertical distance between the contact surfaces of the inspection device to account for location of the measuring plane out of the reference plane. Thus a quantity equal to: $L \cdot TT_{nom}/100$ is subtracted from the nominal pitch diameter;

L being the axial distance between the measuring plane and the reference plane and $TT_{nom}$ being the nominal value of the taper of the thread expressed as a % with respect to the diameter.

The instructions for that device do not, however, attach any particular importance to carrying out the dimensional inspection of the pitch diameter in a measuring plane other than the reference plane.

SUMMARY OF THE INVENTION

In a first aspect, the present invention has sought to develop a method for inspecting a male or female tapered thread which is more particularly adapted to connections with a high degree of tightness the male and female elements of which comprise at least one sealing means, which does not use a hard gauge but which can produce and even guarantee the same performance as the hard gauge inspection method.

We have thus sought to use a method in which the pitch diameter is inspected in a given measuring plane using a plane diameter measuring device.

In the remainder of the present document, the term "plane diameter measuring device", abbreviated to "measuring device", means a device similar or equivalent to that described in U.S. Pat. No. 4,524,524 which can be used to measure a diameter in a given cross-sectional plane of an object to be inspected and which comprises:
a transverse bearing surface;
at least two contact surfaces defined with respect to the measuring plane and a transverse distance from each other and at an adjustable axial distance from the bearing surface;
and a means for measuring the diameter of the circle located in a transverse measuring plane tangential to the contact surfaces at a given axial distance from the bearing surface.

We have also sought to measure the pitch diameter in the cross-sectional plane where it is the most important to carry out the measurement considering the expected sealing characteristics of the connections to be inspected.

One disadvantage of using a plane diameter measuring device is that the pitch diameter to be inspected is only accurately known close to the measuring plane; the value of the pitch diameter in a plane relatively far from the measuring plane is highly uncertain because of the manufacturing tolerances on the taper of the thread to be inspected.

The method of the invention for inspecting a male or female tapered thread located on the external or internal periphery of a male or female tubular element itself located at the end of a metal pipe and comprising at least one sealing means is a method in which the pitch diameter of the thread is inspected in a given measuring plane located at a distance L from the reference plane of the drawing using a plane diameter measuring device provided with a diameter measuring means.

The term "sealing means" as used in the present document defines a means such as, for example, a sealing surface, a transverse bearing surface or an equivalent means.

The male sealing means is/are located close to the free end of the male element while the female sealing means is/are located on the female element so as to co-operate with that/those close to the free end of the male element to which the female element is intended to be coupled.

The method comprises the following steps:
a) a step for adjusting, on said plane diameter measuring device, the distance between the bearing surface and the measuring plane, this distance being a function of the distance between the measuring plane and the reference plane;
b) a step for adjusting said measuring means to a value of the transverse distance between the contact surfaces using a setting block the characteristic dimension of which is defined with respect to the estimated value of the pitch diameter in the measuring plane. Depending on whether the male or female thread is to be inspected, the characteristic dimension is respectively higher or lower than the estimated value of the pitch diameter in the measuring plane by a quantity h; this quantity h is equal to the sum of the height of one thread and a known geometrical correction factor;
c) a step for measuring the diameter between the thread crests of the thread in the selected measuring plane, said measuring device being brought into abutment by its bearing surface against the free end of the element under consideration;
d) a step for comparing the measured diameter between the thread crests with respect to the admissible limits.

The measuring plane for the pitch diameter of the male thread is a plane located between the reference plane and the first perfect male thread. The choice of the measuring plane must of course enable the contact surfaces of the measuring device to be able to be applied over a sufficient length of perfect thread crests.

The measuring plane for the pitch diameter of the male thread is preferably the plane located substantially axially half way between the reference plane and that corresponding to the first perfect male thread.

The measuring plane for the pitch diameter of the tapered female thread is the plane of the drawing which coincides with the measuring plane for the pitch diameter of the male thread when the two male and female threads are connected in the drawing.

In a variation, if the plane of the drawing coinciding with the measuring plane for the pitch diameter of the male thread does not fall into a zone of perfect female threads, the measuring plane for the pitch diameter of the female tapered thread is the cross-sectional plane located in the zone of perfect female threads which is the closest to said coinciding plane.

The estimated value $D_{1e}$ of the pitch diameter of the male thread in the measuring plane is obtained using the following formulae, all of the taper values in the remainder of the present document being referred to the diameter and expressed as a %:

$$D_{1e} = D_{nom} - L1 \cdot TT_{rep1}/100$$

$$TT_{rep1} = TT_{nom} + K1 \cdot \Delta TT1 + \frac{K1 \cdot \sigma 1}{\sqrt{2\pi}} \cdot \exp\left[-\frac{1}{2} \cdot (\Delta TT1/\sigma 1)^2\right]$$
$$- K1 \cdot \Delta TT1 \cdot g(-\Delta TT1/\sigma 1)$$

The estimated value $D_{2e}$ of the pitch diameter of the female thread in the measuring plane is obtained by the following formulae:

$$D_{2e} = D_{nom} - L2 \cdot TT_{rep2}/100$$

$$TT_{rep2} = TT_{nom} + K2 \cdot \Delta TT2 - \frac{K2 \cdot \sigma 2}{\sqrt{2\pi}} \cdot \exp\left[-\frac{1}{2} \cdot (\Delta TT2/\sigma 2)^2\right]$$
$$- K2 \cdot \Delta TT2 \cdot g(\Delta TT2/\sigma 2)$$

Indices 1 and 2 in the equations relate to the male and female threads respectively.

$D_{nom}$ is the nominal value of the pitch diameter in the reference plane;

$TT_{rep}$ is the plot value for the taper;

L is the distance between the measuring plane and the reference plane and is positive when the measuring plane is located on the lower diameter side with respect to the reference plane;

$TT_{nom}$ is the nominal value of the thread taper;

$\Delta TT$ is the algebraic value of the difference $(TT_{av} - TT_{nom})$;

$TT_{min}$, $TT_{max}$ and $TT_{av}$ are respectively the minimum, maximum and mean values of the taper of the threads produced;

$\sigma$ is the standard deviation of the distribution of the taper values produced;

$K_1$ is the ratio of the length of the male thread to the distance between the reference plane ($P_0$) and the first perfect male thread and $K_2$ is the ratio of the length of the female thread to the distance between the reference plane ($P_0$) and the last perfect female thread;

g(x) is the value of the reduced centred normal distribution for the value x of the variable.

The plot value of the taper $TT_{rep}$ defined by its equation corresponds to the taper of a fictitious cone the large diameter of which equal to the nominal value of the pitch diameter is situated in the reference plane and the small diameter of which equal to the mean value of the pitch diameters of the thread being inspected by means of hard gauges is situated in the plane located at the end of the threads of the inspected thread on the side of at least one sealing means.

The present invention solves the problem concerning the place where it is the most important to measure the pitch diameter of the thread to be inspected to optimise the sealing characteristics of the threaded connection.

The inventors have become aware when developing the invention that too large a diametrical thread interference in the zone of the first perfect male threads has a deleterious effect on the sealing of the connection, in particular when a metallic sealing surface is provided between the male thread and the end of the male element to radially interfere with a metallic sealing surface located on the female element.

The diametrical interference between mated points on two surfaces of revolution which radially interfere is generally defined as the difference in the cross-sectional diameter of the surface at these points, measured before connection and being positive when the two surfaces, once connected, exert a contact pressure between the mated points. This definition is applicable to both the interfering threads and to sealing surfaces.

To estimate the value of the diametrical thread interference close to the first perfect male threads, it is necessary to measure the pitch diameter closer to this zone rather than near the last perfect male threads in order not to introduce a large uncertainty due to variability in the taper: such an aim is taken into account in the present invention.

The present invention can also guarantee that the mean value of the pitch diameters of the thread inspected by the method of the present invention in the plane of threads close to at least one sealing means will be the same as when carrying out the inspection using the method of the present invention or using hard gauges as specified in API 5B, even if the measuring plane is not located quite at the end of the thread.

The mean value of the taper of the female thread is preferably less than the mean value of the taper of the male thread associated therewith.

Such a distinction encourages the production of connections where the thread interference is reduced close to at least one sealing means, the value of the diametrical interference of the thread at this level being optimally appreciated by the inspection method of the invention.

The mean value of the taper of the male thread is preferably higher than the nominal value.

In a variation, the mean value of the taper of the female thread is less than the nominal value.

The admissible minimum and maximum values for the diameter measured between the thread crests can be directly defined from the admissible minimum and maximum values for the pitch diameter in the considered measuring plane increased or decreased by the height of one thread depending on whether a male or female thread is to be inspected.

The admissible minimum and maximum values for the pitch diameter can be defined directly from tolerances on the estimated value of the pitch diameter $D_{1e}$ or $D_{2e}$ or by replacing the value of the distance between the reference plane and the measuring plane by the admissible minimum and maximum values of this distance in the formula giving the estimated value of the pitch diameter in the measuring plane.

During the step for adjusting the measuring means, the measuring means is preferably zeroed then during the measuring step, a difference is measured with respect to zero and finally, during the comparison step, the difference is compared with a tolerance range.

Advantageously, when the measuring device has two contact surfaces, the inspection method is carried out four times in the same measuring plane by turning the measuring device or the thread to be inspected by an eighth of a turn between each measurement about the axis of the connection, the diameter between the thread crests in the measuring plane under consideration being taken to be equal to the mean value of four measurements.

In a variation, when the measuring device has three contact surfaces located at 120° to each other, the inspection method is carried out three times, turning the measuring device or the thread by 40°, i.e., a ninth of a turn, about the connection axis between each measurement.

In a second aspect of the invention, the inventor has provided a plane diameter measuring device which enables the method of the invention to be carried out rapidly and thus economically.

When the measuring device has two contact surfaces, the device must be pivoted about one of the two contact surfaces to detect the point of the thread to be inspected which is diametrically opposite the point where the pivot contact surface is applied, the diameter between the thread crests corresponding to the maximum in the measurement made during this pivoting action. The measuring device thus comprises a means for automatically acquiring this maximum.

The invention also seeks to enable the inspection method of the invention to react rapidly in the event of a drift of the production from specifications.

To this end, said measuring device comprises a means for carrying out statistical calculations on the acquired values.

In a third aspect, the invention provides a setting block used to adjust the pre-determined value of the distance between the contact surfaces in the inspection method of the first aspect of the invention.

When inspecting male tapered threads, the setting block used with a measuring device with two contact surfaces is, in accordance with this third aspect, in the form of a truncated wedge comprising:
a transverse end surface; and
two flat faces with a substantially longitudinal orientation, inclined symmetrically with respect to the transverse end surface and converging towards it;
the angle between said flat faces being equal to 2. arc tan $(TT_{av1}/2)$; and
the transverse distance between said inclined flat faces being equal to $(D_{1e}+h)$ to the longitudinal distance $L_A$ from the end surface where h is the quantity defined previously.

In a variation, the setting block used with a measuring device with three contact surfaces is in the form of a truncated cone and comprises a transverse end surface at the cone vertex side and a peripheral tapered surface with a taper of $TT_{av1}$, the diameter of the tapered surface at a distance $L_A$ from the transverse end surface being equal to $(D_{1e}+h)$.

The setting block can also comprise, at the end of its inclined flat faces or of its tapered peripheral surface at the side of the end surface, a portion with a different taper or slope which reproduces the profile of the sealing means of the male element. Such a setting block enables a second plane diameter measuring device to be adjusted in particular to inspect the diameter of the sealing surface.

When inspecting female tapered threads, the block used with a measuring device with two contact surfaces in this third aspect has a transverse end surface and an internal space delimited by two flat surfaces of the block, with a substantially longitudinal orientation, symmetrically inclined with respect to said end surface and converging towards the back of the internal space, the angle between said inclined flat faces being equal to 2.arc tan$(TT_{av2}/2)$ and the transverse distance between said inclined flat faces being equal to $(D_{2e}-h)$ at a longitudinal distance $L_B$ from the end surface, where h is the quantity defined above.

In a variation, to inspect female tapered threads, the setting block used with a measuring device with three contact surfaces comprises a transverse end surface and an internal space delimited by a tapered peripheral surface with a longitudinal axis and a taper of $TT_{av2}$, the vertex of which is directed towards the side opposite to the transverse end surface and in which the diameter at distance $L_B$ from the transverse end surface is equal to $(D_{2e}-h)$.

The setting block for inspecting female tapered threads can also comprise, at the end of its inclined flat surfaces or its tapered peripheral surface at the side opposite to its transverse end surface, a portion with a different taper or slope which reproduces the profile of at least one sealing means on the female element. Such a setting block enables a second plane diameter measuring device to be adjusted to inspect the diameter of the sealing surface.

BRIEF DESCRIPTION OF THE DRAWINGS

The accompanying figures illustrate non limiting examples of embodiments of the invention.

FIG. 6 shows inspection of a male element of the type shown in FIG. 2 using a plane diameter measuring device of the invention.

FIG. 7 shows a detail of FIG. 6 at a contact surface on a plane diameter measuring device.

FIG. 8 shows a detail of FIG. 6 at another contact surface of a plane diameter measuring device.

DESCRIPTION OF THE PREFERRED EMBODIMENTS

Figure 18:
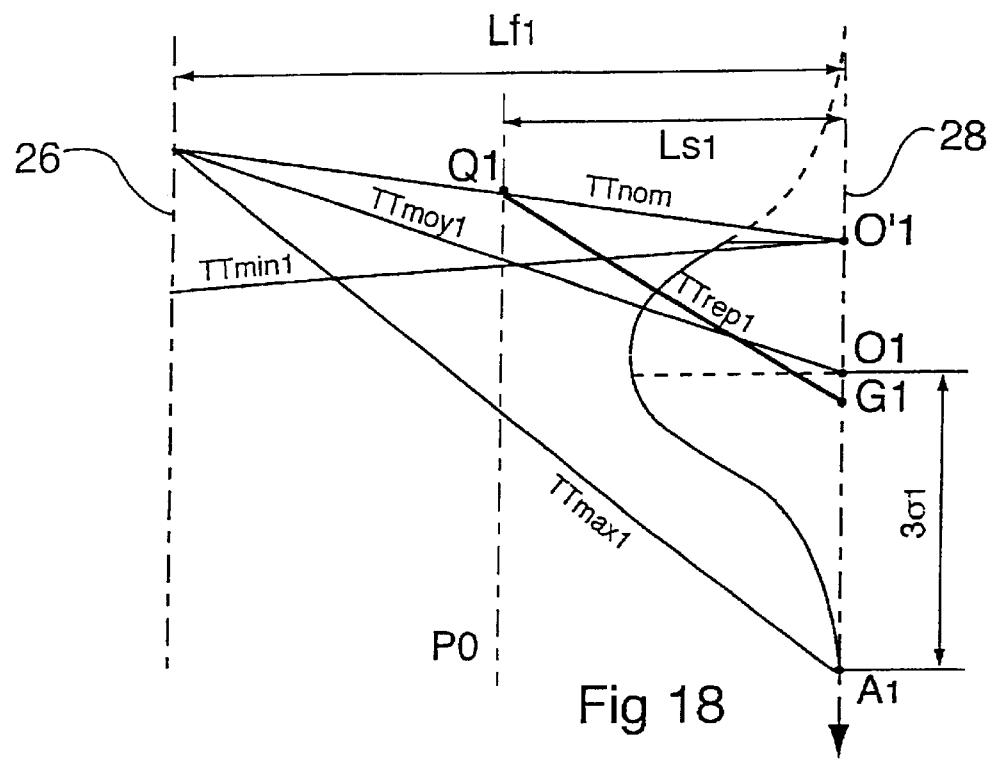
FIG. 18 is a highly schematic illustration of the relationship between the position of the pitch diameter at one end of the male thread for different possible tapers with respect to the position of the pitch diameter of a ring gauge of the type shown in FIG. 5.
Figure 19:
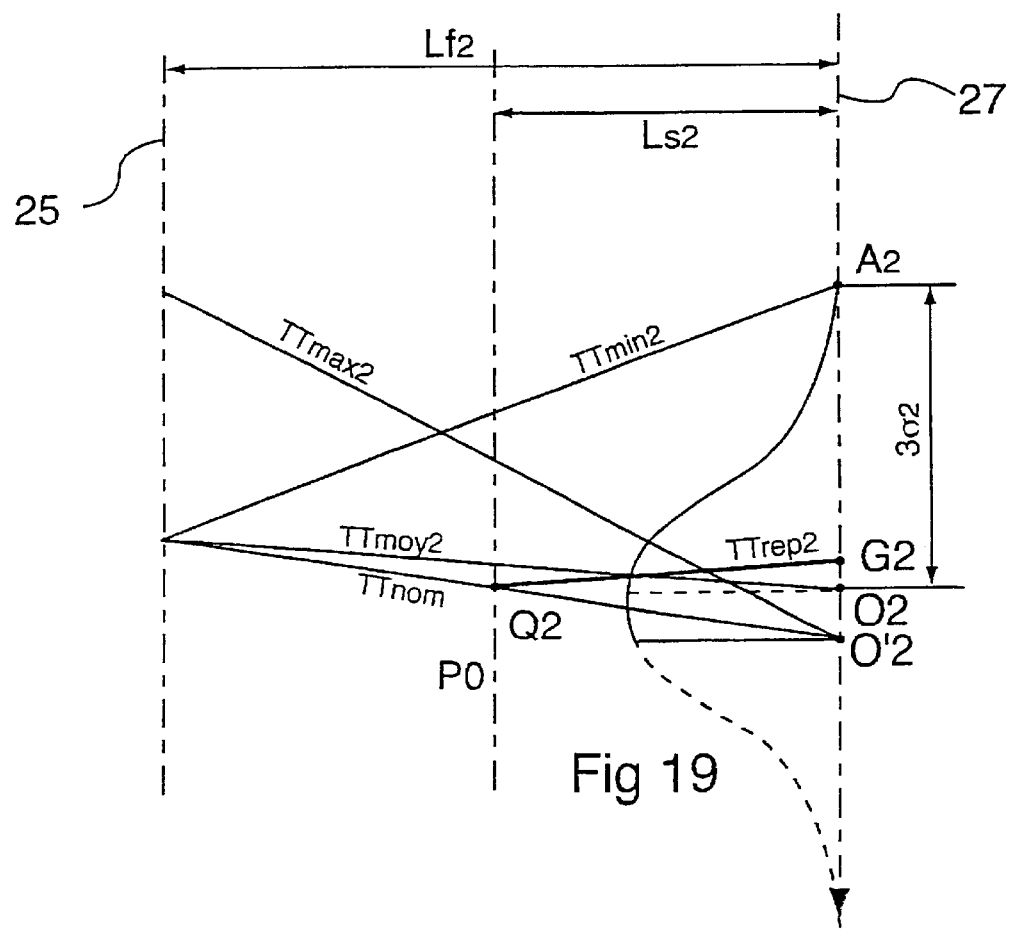
FIG. 19 illustrates the same type of relationship in the case of a female thread with respect to the position of the pitch diameter of a hard gauge of the type shown in FIG. 4.

In FIGS. 18 and 19, the differences in the tapers have been substantially magnified to show the distribution of the values more clearly.

Figure 3:
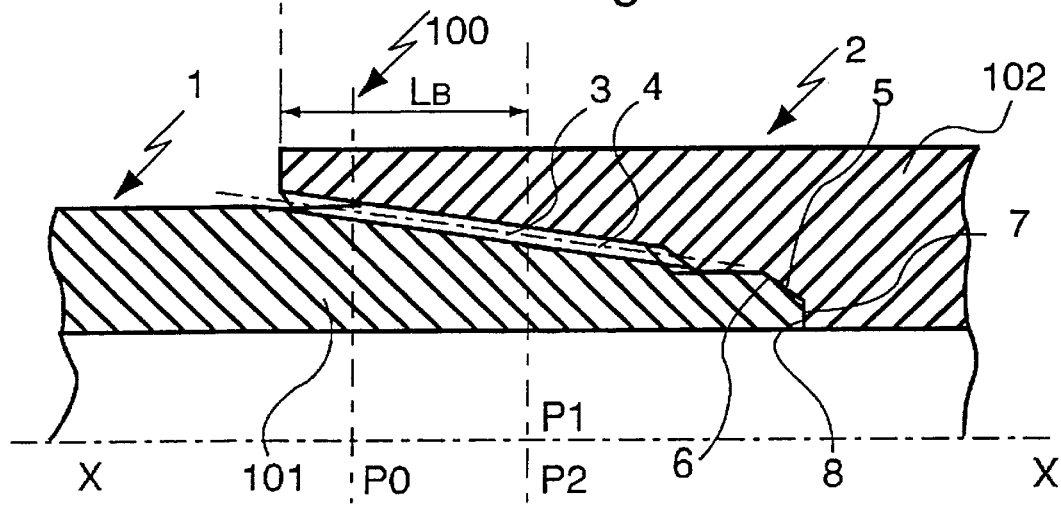
FIG. 3 shows the elements of FIGS. 1 and 2 once connected.

FIG. 3 shows a threaded connection 100 between a male element 1 at the end of a first metal pipe 101 and a female element 2 at the end of a second metal pipe 102 which may be a long pipe or a coupling. Such threaded connections can, for example, constitute strings of casing pipes or tubings for hydrocarbon wells.

Figure 2:
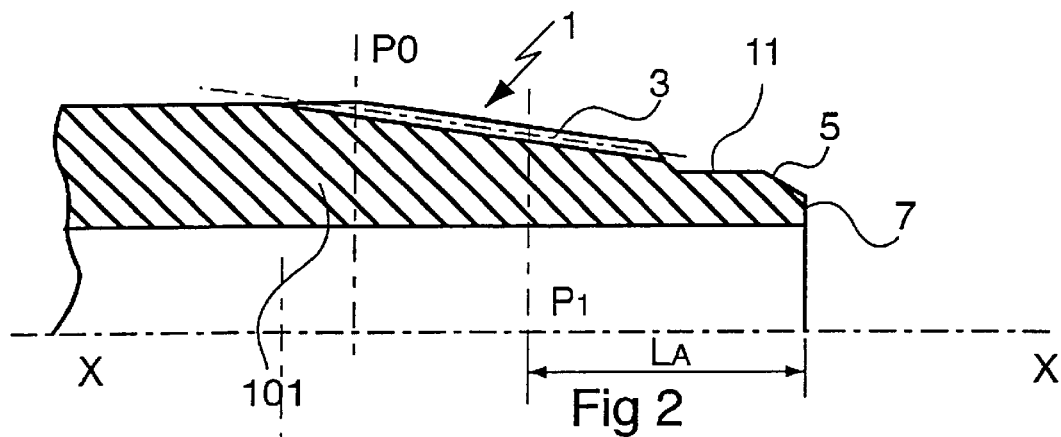
FIG. 2 shows a male threaded element at a pipe end.

Male element 1 shown in FIG. 2 comprises at its external peripheral surface a tapered male threaded portion 3 with trapezoidal threads and its end, which is also the end of the first pipe 101, has an annular and transverse male end surface 7.

Plane $P_0$ is shown in FIG. 2 which, according to specification API 5B, is the cross-sectional plane located at the end of the zone of perfect male threads corresponding to the last perfect male thread.

Figure 1:
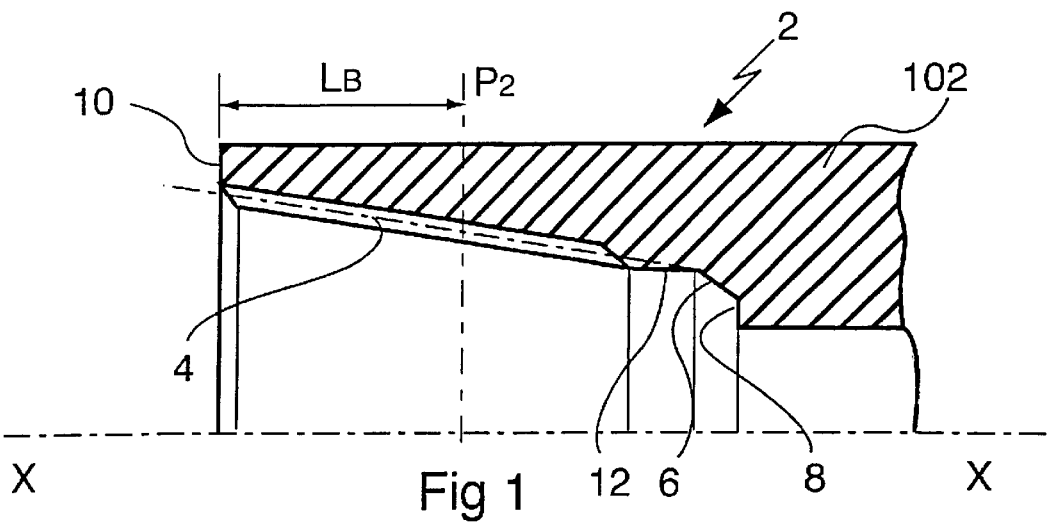
FIG. 1 shows a female threaded element at a pipe end.

Female element 2 represented in FIG. 1 comprises on its internal peripheral surface a tapered female threaded portion 4 with trapezoidal threads mated with the male thread 3 and the end of female element 2, which is also the end of the second pipe 102, has an annular and transverse female end surface 10.

Pipes 101, 102 are coupled by screwing male thread 3 of male element 1 into female thread 4 of female element 2.

Preferably, for carrying out the invention, tapered threaded portions 3, 4 are single stage threads.

The connection of FIG. 3 comprises, on each of the elements, additional means which render the connection particularly tight, namely:

a) on the male element:
an external and tapered male sealing surface 5, the taper of which is generally higher than that of male thread 3; the taper of the male sealing surface 5 with respect to the diameter is 20%, for example;
an annular and transverse bearing surface 7 constituted by the male end surface;

b) on the female element:
an internal and tapered female sealing surface 6 the taper of which is substantially identical to that of the male sealing surface 5;
an internal shoulder with an annular and transverse bearing surface 8.

The male end surface 7 can, as is known, be concavely tapered with a very open vertex half angle, for example 75°, the female bearing surface 8 in this case being convex with the same vertex half-angle.

The additional means 5, 6, 7, 8 operate in the following manner in connection 100.

The male sealing surface 5 radially interferes with the female sealing surface 6, i.e., its diameter at a reference point is higher before connection than the diameter of the mated point of the female sealing surface 6, the diameter also being measured before connection.

On screwing up, once contact has been obtained between the sealing surfaces, continued screwing induces increasing diametrical interference of the sealing surfaces.

The precise position when makeup is complete is determined by abutment of the male end surface 7 against the bearing surface 8 of the internal female shoulder, which defines a precise interference value between the sealing surfaces 5,6.

The bearing surfaces (7, 8) can also act as a sealing means although their transverse disposition renders them less performing than the sealing surfaces (5,6) in this regard.

The position when makeup is complete can in particular be referred to a given value for the makeup torque.

The advantageously concave-convex tapered form of the bearing surfaces 7,8, not shown in the Figures, prevents the bearing surfaces from being dislodged and increases the contact pressure of the sealing surfaces 5,6.

Figure 4:
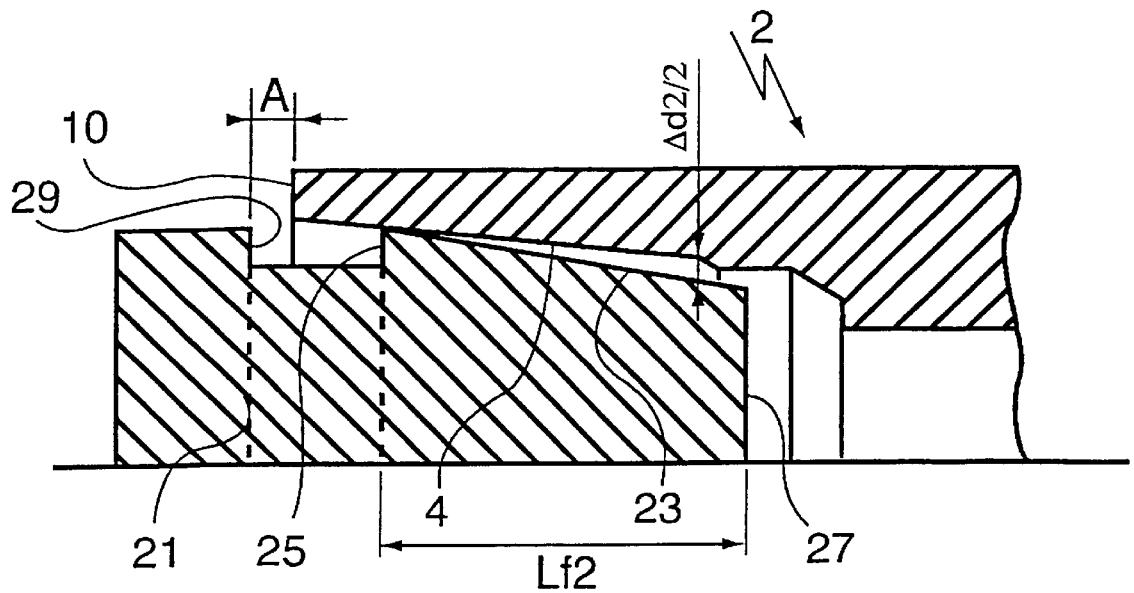
FIG. 4 schematically shows inspection of a female element with a plug gauge in accordance with specification API 5B.

FIG. 4 is a highly schematic illustration of inspection of a female tapered thread 4 on a female element 2 in accordance with specification API 5B using a male plug gauge 21 provided with a male tapered thread 23 produced with tolerances which are substantially narrower than those of the thread 4 to be inspected, for example ten times narrower. Thus the pitch diameter of the gauge in the plane of its last perfect thread can be considered to be equal to the nominal pitch diameter and the taper of the gauge is equal to the taper of the drawing.

Figure 5:
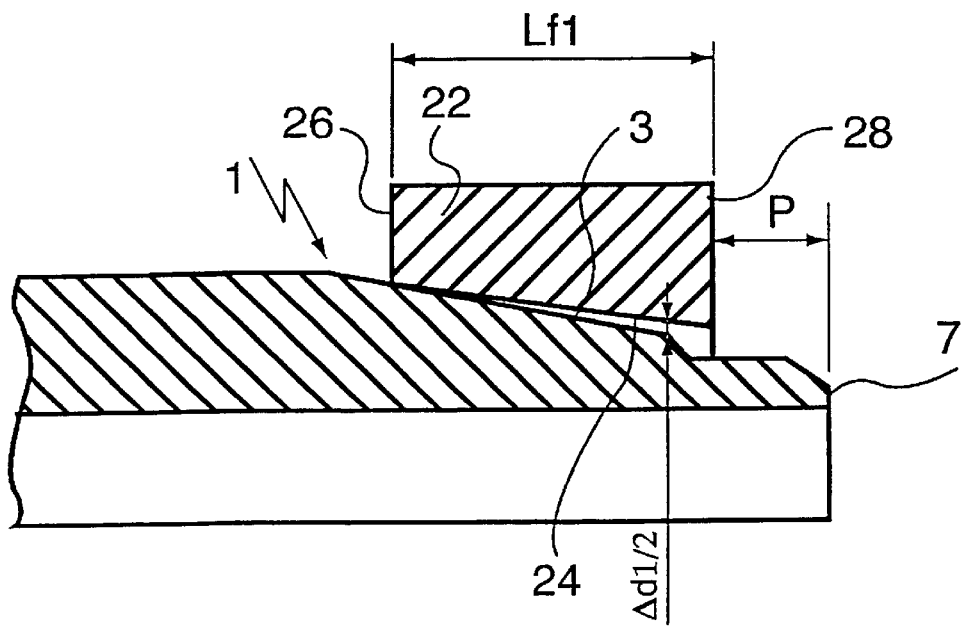
FIG. 5 schematically shows inspection of a male element using a ring gauge in accordance with specification API 5B.

For simplification, FIG. 4 and FIG. 5 only show the pitch cone of the thread, not the taper of the crests and roots of the threads.

Specification API 5B states that to inspect thread 4, plug gauge 21 is hand screwed until it stops, whereupon the pitch diameter of thread 23 at one of ends 25, 27 of the plug gauge 21 is equal to the pitch diameter of the female thread 4 to be inspected in a given plane thereof The distance A between the end of the female element 10 and the annular transverse surface 29 of the plug gauge is compared with the standard value S for this distance for a set ring-gauge/plug gauge pair, the female thread 4 being considered to be acceptable when the difference in distance with respect to the standard value is within a given tolerance interval.

When the threads of plug gauge 21 are in contact with those of the female thread 4 to be inspected at the thread end side 25 of the plug gauge 21, which occurs when the taper of the thread 4 to be inspected is lower than the nominal value, the pitch diameter of thread 4 in the plane located at the end opposite its entrance is higher by a value $\Delta d_2$ than the pitch diameter of the thread of plug gauge 21 in the corresponding plane.

It can thus be considered that, for all values of the taper of female thread 4 below the nominal value, the pitch cone of thread 4 pivots about a point located in the plane located at the end 25 of the thread of the plug gauge.

The opposite occurs when the taper of the thread 4 to be inspected is higher than the nominal value; the pitch cone of the thread 4 then pivots about a point located in the plane located at the end 27 of the thread of the plug gauge.

In the same way, FIG. 5 shows the inspection of a male tapered thread 3 of a male element in accordance with specification API 5B using a ring gauge 22 provided with a female tapered thread 24 produced using very tight tolerances.

Here again, ring gauge 22 is screwed onto male thread 3 to be inspected until it stops which enables a distance P to be defined between the end of male element 7 and the plane located at end 28 of the thread of ring gauge 22.

When the threads of the ring gauge 22 are in contact with those of the male thread 3 to be inspected at the thread end side 26 of the ring gauge, which occurs when the taper of the thread 3 to be inspected is higher than a nominal value, the pitch diameter of thread 3 in the plane located at the start of said thread is less than the pitch diameter of thread 24 of the ring gauge 22 in the corresponding plane.

Thus, for all values of the taper of the male thread 3 which are higher than the nominal value, the pitch cone of thread 3 can be considered to pivot about a point located at end 26 of the thread of the ring gauge.

The opposite occurs when the taper of the male thread 3 is lower than the nominal value; the pitch cone of thread 3 pivots about a point located at the end 28 of the ring gauge thread.

FIG. 6 schematically shows inspection of the pitch diameter of a male tapered thread 3 using a plane diameter measuring device 51 of the type described in U.S. Pat. No. 4,524,524.

Device 51 comprises:
an end traverse 57 which comprises a transverse bearing surface formed by edges 54, 54';
two longitudinal arms 52, 53 which are transversely distant which are mounted on traverse 57 so as to be adjustable depending on the type and diameter of the thread to be inspected;
two longitudinally disposed knives 58, 59, the edges of which are turned towards each other, are transversely distant from each other and constitute contact surfaces 60, 61, knife 58 being mounted on the longitudinal arm 52 so as to be able to pivot only in its plane while knife 59 is mounted in the same pivotal manner on a mobile rod 56 disposed transversely;

a measuring means which here is a comparator 55 located on the longitudinal arm and driven by the mobile rod 56.

The pivotal axes of the knives define a measuring plane P1, transverse to the measuring device 51 and parallel to bearing surface 54, 54'; the traverse 57 can be slid such that the measuring plane P1 is located at a given distance $L_A$ from bearing surface 54, 54'.

Comparator 55 measures the difference in distance between contact surface 61 and contact surface 60 with respect to a pre-determined value corresponding to the zero of the comparator. The diameter between the thread crests $D_{1s}$, is then measured by adding the algebraic value of the difference measured by comparator 55 to the pre-determined value.

Comparator 55 can advantageously be replaced by an electronic displacement sensor which automatically acquires and records the measurements.

The male thread 3 is inspected as follows.

The distance $L_A$ between bearing surface 54, 54' and measuring plane P1 is adjusted to the value corresponding in the drawing in FIG. 2 to the distance between the plane P1 and the end surface 7 of male element 1. This distance $L_A$ is equal to the difference between the distance of $P_0$ to end 7 and the distance $L_1$ between planes $P_0$ and $P_1$.

The position of the measuring plane P1 is selected such that contact surfaces 60, 61 rest on the crests of perfect threads, the contact surfaces 60, 61 being of sufficient length to come into contact with at least two thread crests 13.

The position of measuring plane $P_1$ is preferably selected, as shown in FIG. 2, half way between reference plane $P_0$ and the plane corresponding to the first perfect male thread.

Such a position enables the pitch diameter to be measured much closer to the start of the male thread and thus the value of the diametrical interference at this level can be better appreciated while ensuring correct seating of the contact surfaces 60, 61 even when the perfect thread zone is relatively short.

Figures 10, 11, 12, 13:
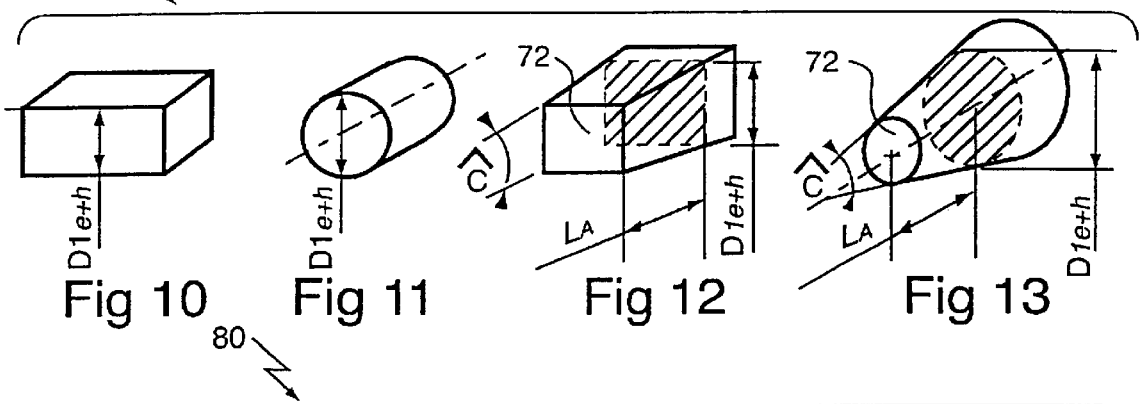
FIGS. 10 to 13 show variations of solid setting blocks for use in inspecting the male thread according to FIG. 6 while FIGS. 14 to 17 relate to hollow setting blocks for use when inspecting the female thread of FIG. 9.

The zero of comparator 55 is then adjusted or the predetermined value is then directly applied by interposing between the contact surfaces 60, 61 the two flat faces of the setting block 70 of FIG. 10, these flat surfaces being separated from each other by a distance $(D_{1e}+h)$ which is the characteristic dimension of the setting block; $D_{1e}$ is the estimated value of the pitch diameter of the thread to be inspected in the measuring plane; h is equal to the sum of the height of the thread and a geometrical correction factor given by the manufacturer of the measuring device 51; this correction factor takes into account the fact that knives 58, 59 do not pivot about contact surfaces 60, 61.

Such a setting block 70 is much cheaper to produce than a threaded gauge such as 22 since it does not include a thread and also wears much less quickly as it is not subjected to multiple screwing and unscrewing operations.

$D_{1e}$ is determined using the following relationship:

$$D_{1e}=D_{nom}-L_1 \cdot TT_{rep1}/100$$

$D_{nom}$ is the nominal value of the pitch diameter, thus the pitch diameter value in reference plane $P_0$;

$L_1$ is the distance between the planes $P_0$ and $P_1$ which is positive when $P_1$ is on the lower diameter side with respect to $P_0$;

$TT_{rep1}$ is the plot value of the male taper which will be defined below; it is higher than the nominal value of the taper.

In a variation, to regulate the zero of the comparator 55, instead of using a setting block with two flat parallel surfaces, a setting block 70 can be used which is in the form of the truncated wedge of FIG. 12. Block 70 comprises a transverse end surface 72 and two substantially longitudinally orientated flat faces, symmetrically inclined with respect to the transverse end surface and converging towards it; angle C between the inclined flat surfaces is equal to 2.arc tan($TT_{av1}/2$) and the transverse distance between the inclined flat faces is equal to $(D_{1e}+h)$ at the longitudinal distance $L_A$ from end surface 72. Setting block 70 is inserted so as to apply its end surface 72 against the bearing surface 54, 54' of measuring device 51 and its inclined flat faces between contact surfaces 60, 61 of measuring device 51. Thus only a single setting block 70 is required regardless of the distance $L_1$.

In a variation in FIG. 12, the angle C between the inclined planes is equal to 2.arc tan $(TT_{rep1}/2)$ and the transverse distance between the inclined flat faces is equal to $(D_{nom}+h)$ at the longitudinal distance $(L_A+L_1)$ from end surface 72.

The setting block 70 can also comprise, at the end of the flat faces on the side of end surface 72, a portion which is not shown in FIG. 12 with a different slope which reproduces the profile of the sealing means of male element 1, in particular the sealing surface 5 and optionally the male end surface 7. Such a setting block can enable a second plane diameter measuring device 51 to be adjusted to inspect the diameter of the sealing surface 5.

The measurement is carried out by disposing measuring device 51 so as to place its bearing surface 54, 54' against the end surface 7 of male element 1 or against the most external points of this end surface when it is not flat but is, for example, slightly concavely tapered with a vertex half-angle of 75°, and the contact surfaces 60, 61 are placed in external contact with the diametrically opposed crests 13 of the male thread.

During the measurement, the contact surface 60 is kept fixed to the crests of the thread with which it is in contact while the measuring device 51 is pivoted, the contact surface 61 remaining in contact with the opposite thread crest during pivoting.

The measurement of the diameter $D_{1s}$ between the thread crests in the measuring plane $P_1$ corresponds to the maximum value of the transverse distance between contact surfaces 60, 61 during pivoting, which maximum value can be obtained by reading the comparator 55 or, better, can be automatically determined if an electronic sensor is used in place of comparator 55 and an electronic circuit is used which detects and memorises the maximum value as the plane diameter measuring device is pivoted about contact surface 60.

The final step of the male thread 3 inspection method is a comparison between the value $D_{1s}$ measured for the diameter between the thread crests and the admissible limits defined by an interval about $D_{1e}$.

The value $D_1$ of the male pitch diameter in the measuring plane $P_1$ is obtained by subtracting the quantity h defined above from the measured value $D_{1s}$ of the diameter between the crests of the threads in the same plane $P_1$, the values of the limits of the admissible interval of the diameter measured between the thread crests $D_{1s}$ being able to be directly defined from the limits for the pitch diameter $D_1$, increased by a quantity h.

They can also be indirectly obtained by replacing, in the formula $D_{1e}=D_{nom}-L_1 \cdot TT_{rep1}/100$ giving the estimated value of the pitch diameter in the measuring plane, the value of the distance $L_1$ between the reference plane and the measuring plane by values $L_{1min}$, $L_{1max}$ which encompass distance $L_1$ with $\pm \Delta L_1$.

The way $TT_{rep1}$ is obtained is defined by the following calculation which is explained by FIG. 18.

In general, the mean value of the pitch diameter of the male thread 3 inspected according to the present method is set to equal the mean value of the pitch diameters of thread 3 inspected with a ring gauge 22 in accordance with specification API 5B, in the plane of end 28 of this ring gauge 22 which is positioned on mean on the first perfect male thread.

The point $G_1$ on FIG. 18 marks the mean value of the pitch diameter of thread 3 in the end plane 28 of the ring gauge, which on the ring gauge is distant by $L_{s1}$ from the reference plane $P_0$ and $L_{f1}$ from plane 26 located at the other end of the thread of the ring gauge.

It is assumed that:
a) As indicated above, the pitch cone of the thread produced pivot about a point located at one end or the other of the thread of the ring gauge 22 screwed onto male thread 3 to be inspected depending on whether the taper $TT_1$ of inspected thread 3 is higher or lower than the taper of the ring gauge thread, which is assumed to be equal to the nominal value of the taper.
b) The distribution of the tapers of the threads produced follows a normal distribution centred on the mean value $TT_{av1}$ of the taper, the interval between the maximum value and the minimum value of the tapers ($TT_{max_1} - TT_{min_1}$) being equal to 6 times the standard deviation $\sigma_1$ of the distribution.

It follows that if the taper of the inspected thread is higher than the nominal value $TT_{nom}$, the point of the inspected thread in end plane 28 of the ring gauge is located in the interval $O'_1 A_1$, the point $O'_1$ corresponding to the taper $TT_{nom}$ of the ring gauge and the point $A_1$ corresponding to the maximum value $TT_{max1}$ of the taper of the thread to be inspected. The probability density at any point in the interval $O'_1 A_1$ follows a Gaussian law centred on $O_1$ illustrated by the portion of the bell curve shown in solid lines in FIG. 18, the point $O_1$ corresponding to the mean value $TT_{av1}$ of the taper of the thread 3 to be inspected.

If the taper $TT_1$ of the inspected thread is less than the nominal value $TT_{nom}$, the end of the inspected thread in end plane 28 of the ring gauge is the pivot point $O'_1$. The probability associated with the position of point $O'_1$ is equal to the area of the portion of the bell curve of FIG. 18 in dotted lines.

The mean resultant value of the position of the thread end in the plane 28 is the centre of gravity $G_1$ of the positions for the whole of the taper values from $TT_{min1}$ to $TT_{max1}$ and enables a plot value $TT_{rep1}$ to be defined for the taper by the slope of the line $Q_1 G_1$, the point $Q_1$ corresponding to the nominal value of the pitch diameter.

On an axis directed from $O'_1$ to $A_1$:

$$TT_{rep1} = TT_{nom} + O'_1 G_1/L_{s1} = TT_{nom} + O'_1 O_1/L_{s1} + O_1 G_1/L_{s1}$$

$$\frac{O'_1 O_1}{L_{s1}} = \frac{L_{f1}}{L_{s1}} \cdot \Delta TT1$$

The ratio $L_{f1}/L_{s1}$ is again equal to the ratio $K_1$ of the length of the male thread to the distance between the reference plane $P_0$ and the first perfect male thread.

$$\frac{O1G1}{Lf1 \cdot \sigma 1} = \int_{-\infty}^{+\infty} f(x) \cdot \rho(x) \cdot dx$$

x is a reduced centred variable equal to $(TT_1 - TT_{av1})/\sigma_1$ which can vary from $-\infty$ to $+\infty$, $TT_1$ corresponding to the taper variable.

f(x) is a Gaussian function=

$$\frac{1}{\sqrt{2\pi}} \exp(-x^2/2)$$

where $$\rho(x) = x \quad \text{for } x > -\Delta TT_1/\sigma_1, \text{ i.e., for } TT_1 > TT_{nom}$$
$$\rho(x) = -\Delta TT_1/\sigma_1 \quad \text{for } x \leq -\Delta TT_1/\sigma_1, \text{ i.e., for } TT_1 \leq TT_{nom}$$

$$\frac{O1G1}{Lf1 \cdot \sigma 1} = \int_{-\infty}^{-\Delta TT1/\sigma 1} \frac{-\Delta TT1}{\sqrt{2\pi} \cdot \sigma 1} \exp(-x^2/2) \cdot dx + \frac{1}{\sqrt{2\pi}} \int_{-\Delta TT1/\sigma 1}^{+\infty} x \cdot \exp(-x^2/2) \cdot dx$$

The following formula can readily be deduced:

$$TT_{rep1} = TT_{nom} + K1 \cdot \Delta TT1 + \frac{K1 \cdot \sigma 1}{\sqrt{2\pi}} \cdot \exp\left[-\frac{1}{2} \cdot (\Delta TT1/\sigma 1)^2\right] - K1 \cdot \Delta TT1 \cdot g(-\Delta TT1/\sigma 1)$$

Numerical example $TT_{nom} = 6.25\% \quad K_1 = 2.22$ $TT_{min1} = 6.10\% \quad TT_{max1} = 6.60\% \quad TT_{av1} = 6.35\%$ $\Delta TT_1 = (TT_{av1} - TT_{nom}) = 0.10\% \quad \sigma_1 = (6.60 - 6.10)/6 = 0.08\%$ We obtain: $TT_{rep1} = 6.48\%$.

Preferably, the value $TT_{rep1}$ is intended to be in the range between $TT_{nom}$ and $TT_{max1}$, corresponding to the case of the present numerical example. The cone formed by the thread crests 13 can have geometrical imperfections, such as ovality, hollows and periodic bumps in a cross-section.

To obtain a representative measurement of the pitch diameter in the measuring plane $P_1$, it is thus advantageous to take a plurality of measurements of the diameter.

The inventors have established that in the case of a measuring device with two contact surfaces 60, 61 of the type shown by device 51, it is not necessary to carry out more than four measurements to obtain a representative value of the pitch diameter in the plane $P_1$.

It is thus proposed to carry out four successive determinations or measurements of the pitch diameter by turning the measuring device 51 or thread 3 to be inspected through 45°, i.e., an eighth of a turn, about the thread axis between each measurement, $D_1$ being taken to be equal to the mean value of these four measurements.

In a variation (not shown), the plane diameter measuring device comprises, in known fashion, three contact surfaces spaced by 120° from each other which can directly define the circle formed by the intersection of the cone of the thread crests with the measuring plane $P_1$ and, as a result, the diameter between the thread crests $D_{1s}$ without it being necessary to pivot the device about a contact surface during the measurement.

The setting block 70 thus, as is shown in FIG. 11, has a cylindrical shape with diameter $D_{1s}$.

In a variation shown in FIG. 13, it has a truncated conical shape with a diameter equal to: $(D_{1e}+h)$ in a cross-sectional plane located at a longitudinal distance $L_A$ from the transverse surface of small diameter end 72 of the truncated cone; its taper is equal to the value $TT_{av1}$, the tapered setting block 70 being inserted so as to apply its end surface 72 with the small diameter against the bearing surface 54, 54' of the measuring device 51 and its tapered peripheral surface between the contact surfaces of measuring device 51. Thus only one setting block is needed regardless of the length $L_A$, as is the case in FIG. 12.

In a variation of FIG. 13, the setting block 70 has a diameter equal to: $(D_{nom}+h)$ in a cross-sectional plane located at a longitudinal distance $(L_A+L_1)$ from the transverse surface of small diameter end 72 of the truncated cone; its taper is equal to the value $TT_{rep1}$.

In a variation, not shown in FIG. 13, the setting block 70 can also comprise, at the end of its tapered peripheral surface on the side of end surface 72, a portion which is not shown in FIG. 12 with a different taper which reproduces the profile of the end of male element 1, in particular of the sealing surface 5 and possibly the male end surface 7. Such a setting block enables a second plane diameter measuring device 51 to be adjusted to inspect the diameter of the sealing surface 5.

With a measuring device with three contact surfaces, the inventors have established that three measurements of the pitch diameter are sufficient, by turning the measuring device or thread 3 to be inspected through 40°, i.e., a ninth of a turn, about the thread axis between each measurement and to take the mean value of these three measurements to obtain a representative value for $D_1$ in the measuring plane $P_1$.

Figure 9:
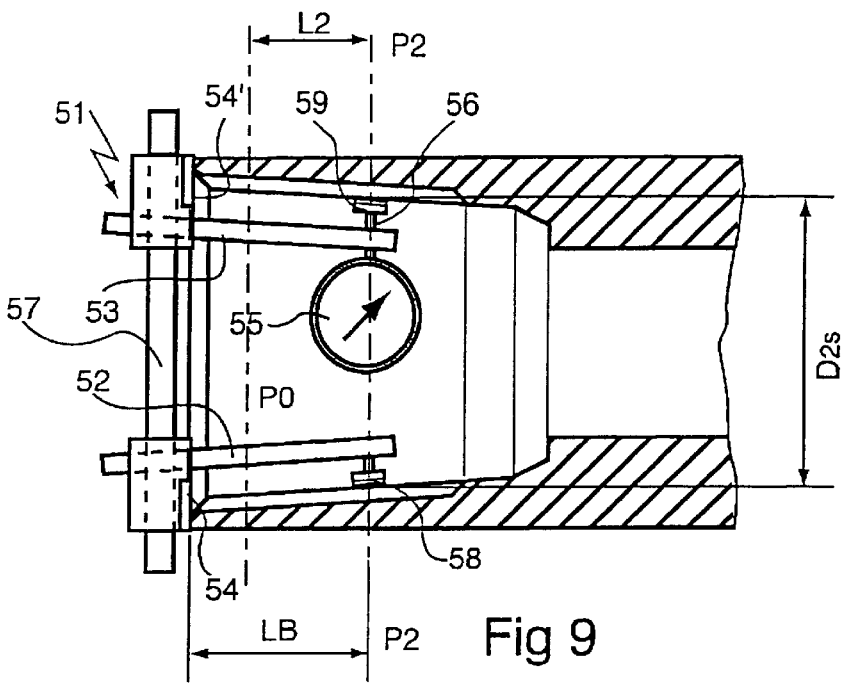
FIG. 9 shows inspection of a female element of the type shown in FIG. 1 using a plane diameter measuring device of the invention.

FIGS. 9 and 19 are the counterpart to FIGS. 6 and 18 and illustrate and explain the inspection of the pitch diameter $D_2$ of a female tapered thread 4 in the measuring plane $P_2$ using a plane diameter measuring device 51.

The measuring device 51 of FIG. 9 is substantially identical to that of FIG. 6 except that when used to inspect the female thread, longitudinal arms 52, 53 are pivoted through 180° so that contact surfaces 60, 61 are directed in the opposite direction to each other.

The inspection method comprises the same steps as that relating to the male thread, with some differences which will now be explained.

Firstly, the distance $L_B$ between the bearing surface 54, 54' and the measuring plane $P_2$ is adjusted on the measuring device 51.

The position of the measuring plane $P_2$ has been selected on FIG. 3 such that it is located in a zone with perfect female threads and is the closest to the plane of the drawing which coincides with the measuring plane $P_1$ of the male thread when, on the drawing, the male and female thread are connected.

FIG. 3 shows such a case when plane $P_2$ coincides with plane $P_1$ on the drawing of the connection. The distance $L_B$ thus corresponds on FIG. 3 to the distance between the plane $P_2$ and the end surface 10 of the female element 2.

Figures 14, 15, 16, 17:
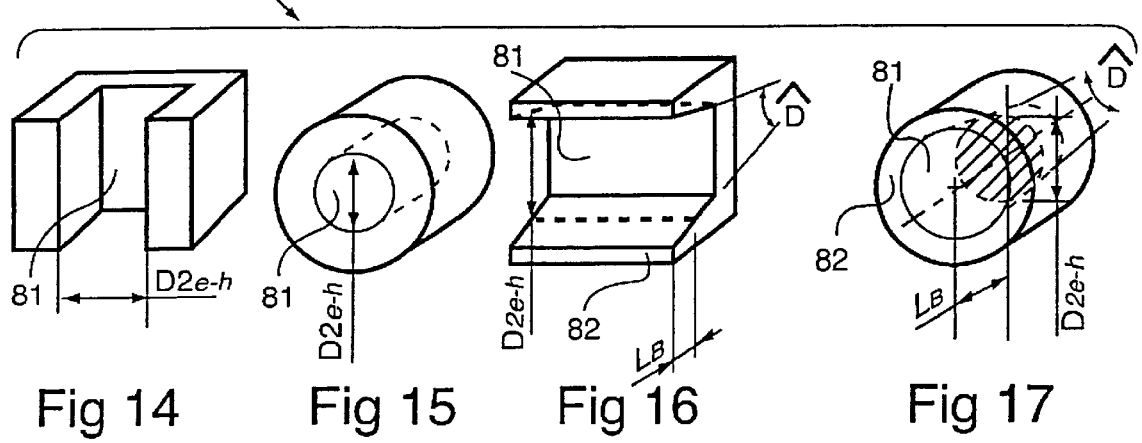

The zero of the comparator 55 is adjusted by placing the contact surfaces 60, 61 on the two flat parallel faces facing each other of the branches of a U shaped setting block 80 of FIG. 14, the two flat faces delimiting an internal space 81 of width $(D_{2e}-h)$. In this formula, $D_{2e}$ is the estimated value of the pitch diameter in the measuring plane $P_2$ and h represents the sum of the height of a thread and a geometrical correction factor for the measuring device 51 which is known per se, as indicated above.

To determine $D_{2e}$, a relationship which is similar to that for the male thread is used:

$$D_{2e}=D_{nom}-L_2 \cdot TT_{rep2}/100$$

$D_{nom}$ is the nominal value of the pitch diameter;

$L_2$ is the distance between the planes $P_0$ and $P_2$ which is considered to be positive since $P_2$ is on the lower diameter side with respect to $P_0$;

$TT_{rep2}$ is the plot value of the female taper which will be defined below; it is lower than the nominal value of the taper.

In a variation, instead of using the setting block of FIG. 14 comprising an internal space delimited by two parallel flat faces, the U shaped block 80 of FIG. 16 can be used which has a transverse end surface 82 and in which the internal space 81 is delimited by two wedge shaped inclined flat faces, with a substantially longitudinal orientation, symmetrically inclined with respect to the end surface 82 and converging towards the back of the internal space 81, i.e., towards the bottom of the U. The angle D between the inclined flat surfaces equals 2.arc tan($TT_{av2}/2$) and the transverse distance between the inclined flat faces is equal to $(D_{2e}-h)$ at the longitudinal distance $L_B$ from end surface 82. Measuring device 51 is inserted so as to apply its bearing surface 54, 54' against the end surface 82 of setting block 80 and its contact surfaces 60, 61 against the inclined flat faces of block 80. Thus only one setting block 80 is required regardless of the distance $L_B$.

In a variation of FIG. 16, the angle D between the inclined flat surfaces is equal to 2.arc tan($TT_{rep2}/2$) and the transverse distance between the inclined flat faces at the longitudinal distance $(L_B-L_2)$ from the end surface 82 is equal to $(D_{nom}-h)$.

In a variation which is not shown in FIG. 16, setting block 80 can also comprise, at the end of its tapered peripheral surface on the side of the end surface 82, a portion which is not shown in FIG. 16 with a different taper which reproduces the profile of the end of the female element 2, in particular of the sealing surface 6 and possibly of the female bearing surface 8. Such a setting block enables a second plane diameter measuring device 51 to be adjusted to inspect the diameter of the sealing surface 6.

The measurement is made in the same manner as in the case of a male thread by placing the bearing surface 54, 54' against the end surface 10 of the female thread 4 to be inspected and bringing the contact surfaces 60, 61 into internal contact with the crests of diametrically opposed female threads.

The device is pivoted about the contact surface 61 which pivots while resting in contact with the thread crests.

The diameter $D_{2s}$ between the thread crests is measured and corresponds to the maximum value of the transverse distance between the contact surfaces 60, 61.

As is the case for the male thread, this value can be read on the comparator 55 or directly recorded if the appropriate electrical circuits described above are used.

As in the case of the male thread, it is possible to use a plane diameter measuring device which comprises three contact surfaces and which provides the value of $D_{2s}$ without needing to pivot the device about one of its contact surfaces.

In this case, the setting block 80 of FIG. 15 is used, comprising a cylindrical cavity.

In a variation, the setting block 80 of FIG. 17 is used, comprising a transverse end surface 82 and an internal space 81 delimited by a tapered peripheral surface with a taper of $TT_{av2}$, the vertex of which is directed towards the side opposite to the transverse end surface and for which the diameter at a distance $L_B$ from the transverse end surface 82 is equal to $(D_{2e}-h)$. The measuring device 51 is inserted so as to apply the bearing surface 54, 54' against the end surface 82 of the setting block 80 and its contact surfaces against the tapered peripheral surface of the setting block 80. Thus only one setting block is required regardless of the length $L_B$ as is the case in FIG. 16.

In a variation shown in FIG. 17, the tapered peripheral surface has a taper of $TT_{rep2}$ and its diameter at a distance $(L_B-L_2)$ from the transverse end surface 82 is equal to $(D_{nom}-h)$.

In a variation which is not shown in FIG. 17, the setting block 80 can also have, at the end of its tapered peripheral surface, on the end surface 82 side, a portion which is not shown in FIG. 17 with a different taper which reproduces the profile of the sealing means of female element 2, in particular the sealing surface 6 and possibly the female bearing surface 8. Such a setting block enables a second plane diameter measuring device 51 to be adjusted to inspect the diameter of the sealing surface 6.

The measurement of the diameter $D_{2s}$ between the crests of the threads in the measuring plane $P_2$ is made in the same manner as the measurement of the diameter $D_{1s}$ on the male thread.

The final step of the female thread 4 inspection method is a comparison between the value $D_{2s}$ measured between the crests of the threads and the admissible limits defined by a range about $D_{2e}$.

The value $D_2$ of the female thread 4 pitch diameter in the measuring plane $P_2$ is obtained by adding the quantity h defined above to the measured value $D_{2s}$.

The limits of the admissible range for the diameter measured between the thread crests $D_{2s}$ can be directly defined from the limits for the pitch diameter $D_2$, minus the quantity h.

They can also be indirectly obtained by replacing, in the formula $D_{2e}=D_{nom}-L_2 \cdot TT_{rep2}/100$ giving the estimated value of the pitch diameter in the measuring plane, the value of distance $L_2$ between planes $P_0$ and $P_2$ by values $L_{2min}$, $L_{2max}$ which encompass distance $L_2$ with $\pm \Delta L_2$.

$D_{2e}$, is determined from the following relationships illustrated by FIG. 19 using the same type of calculation as that for the determination of $D_{1e}$.

In general, the mean value of the pitch diameter of the female threads 4 inspected according to the present method is intended to be equal to the mean value of the pitch diameter of thread 4 inspected with a plug gauge 21 in accordance with specification API 5B, in the plane of end 27 of this plug gauge 21 which is positioned on mean on the last perfect female thread.

The point $G_2$ on FIG. 19 marks the mean value of the pitch diameter of thread 4 in the end plane 27 of the plug gauge, which is distant by $L_{s2}$ from the reference plane $P_0$ and $L_{f2}$ from plane 25 located at the other end of the plug gauge.

It is assumed that:
a) As indicated above, the pitch cones of the threads produced pivot about a point located at one end or the other of a thread of the plug gauge 21 screwed onto the male thread 4 to be inspected depending on whether the taper $TT_2$ of inspected thread 4 is lower or higher than the taper of the thread of the plug gauge, which latter is assumed to be equal to the nominal value of the taper.
b) The distribution of the tapers of the threads produced follows a normal distribution law centred on the mean value $TT_{av2}$ of the taper, the interval between the maximum value and the minimum value of the tapers ($TT_{max2}-TT_{min2}$) being equal to 6 times the standard deviation $\sigma_2$ of the distribution.

It follows that if the taper of the inspected thread is lower than the nominal value $TT_{nom}$, the point of the inspected thread in plane 27 of the end of the plug gauge is located in the interval $O'_2 A_2$, the point $O'_2$ corresponding to the taper $TT_{nom}$ of the plug gauge and the point $A_2$ corresponding to the minimum value $TT_{min2}$ of the taper of the thread to be inspected. The probability density at any point in the interval $O'_2 A_2$ follows a Gaussian law centred on $O_1$ illustrated by the portion of the bell curve shown in solid lines in FIG. 19, the point $O_1$ corresponding to the mean value $TT_{av2}$ of the taper of the thread 4 to be inspected.

If the taper $TT_2$ of the inspected thread is less than the nominal value $TT_{nom}$, the end of the inspected thread in the end plane 27 of the plug gauge is the pivot point $O'_2$. The probability associated with the position of the point $O'_2$ is equal to the area of the portion of the bell curve of FIG. 19 in dotted lines.

The mean resultant value of the position of the thread end in plane 27 is the centre of gravity $G_2$ of the positions for the whole of the taper values from $TT_{min2}$ to $TT_{max2}$ and enables a plot value $TT_{rep2}$ to be defined for the taper by the slope of the line $Q_2 G_2$, the point $Q_2$ corresponding to the nominal value of the pitch diameter.

On an axis directed from $O'_2$ to $A_2$:

$$TT_{rep2}TT_{nom}+O'_2G_2/L_{s2}=TT_{nom}+O'_2O_2/L_{s2}+O_2G_2/L_{s2}$$

$$\frac{O'_2 O_2}{Ls2} = \frac{Lf2}{Ls2} \cdot \Delta TT2$$

The ratio $L_{f2}/L_{s2}$ is equal to the ratio $K_2$ of the length of the male thread to the distance between the reference plane $P_0$ and the last perfect male thread.

$$\frac{O_2 G_2}{Lf2 \cdot \sigma 2} = \int_{-\infty}^{+\infty} f(x) \cdot \rho(x) \cdot dx$$

x is a reduced centred variable equal to $(TT_2-TT_{av2})/\sigma_2$ which can vary from $-\infty$ to $+\infty$, $TT_2$ corresponding to the taper variable.

$$f(x) \text{ is a Gaussian function} = \frac{1}{\sqrt{2\pi}} \exp(-x^2/2)$$

where $$\rho(x) = x \quad \text{for } x < -\Delta TT2/\sigma_2, \text{ i.e., for } TT_2 < TT_{nom}$$

$$\rho(x) = -\Delta TT2/\sigma_2 \quad \text{for } x \geq -\Delta TT2/\sigma_2, \text{ i.e., for } TT_2 \geq TT_{nom}$$

$$\frac{O_2 G_2}{Lf2 \cdot \sigma 2} = \frac{1}{\sqrt{2\pi}} \int_{-\infty}^{-\Delta TT2/\sigma 2} x \cdot \exp(-x^2/2) \cdot dx - \frac{\Delta TT2}{\sqrt{2\pi} \cdot \sigma 2} \int_{-\Delta TT2/\sigma 2}^{+\infty} \exp(-x^2/2) \cdot dx$$

The following formula can readily be deduced:

$$TT_{rep2} = TT_{nom} + K2 \cdot \Delta TT2 -$$

-continued $$\frac{K2 \cdot \sigma 2}{\sqrt{2\pi}} \cdot \exp\left[-\frac{1}{2} \cdot (\Delta TT2/\sigma 2)^2\right] - K2 \cdot \Delta TT2 \cdot g(\Delta TT2/\sigma 2)$$

Numerical example $TT_{nom} = 6.25\%$  $K_1 = 2.22$ $TT_{min2} = 6.05\%$  $TT_{max2} = 6.45\%$  $TT_{av2} = 6.25\%$ $\Delta TT_2 = 0\%$  $\sigma_2 = 0.07\%$ $TT_{rep2}$=6.19% and is within the desired interval between $TT_{min2}$ and $TT_{nom}$.

It is advantageous for the performances of the male or female threads inspected in the method of the present invention that the mean value of $TT_{av2}$ of the taper of the female thread 4 is less than the mean value $TT_{av1}$ of the taper of the male thread 3, each of the male and female elements 1, 2 comprising sealing means such as a sealing surface 5, 6 which radially interferes with that of the mated element on connection 100 and/or bearing surface 7, 8 abutted with that of the mated element on connection 100, the male sealing means 5, 7 being disposed close to the free end of male element 1.

When the mean values of the tapers are so distinct, the threads tend to hardly interfere close to the sealing means. The inventors have been able to show that a low thread interference close to the sealing means (5, 6, 7, 8) is favourable as regards the contact pressure of the sealing means.

The mean value $TT_{av1}$ of the taper of the male thread can be higher than the nominal value $TT_{nom}$.

The mean value $TT_{av2}$ of the taper of the female thread can be less than the nominal value $TT_{nom}$.

Table 1 below results from numerical calculations on a connection of pipes with a diameter of 177.8 mm (7"), a thickness of 8.05 mm (23 lb/ft using the imperial units used in the industry) and with a minimum yield strength (SMYS) of 551 MPa, the connection being similar to that of FIG. 3. It gives the value of the contact pressure at the sealing surfaces 5, 6, calculated for a makeup torque of 9.8 kN.m.

TABLE 1

CONTACT PRESSURE ON SEALING SURFACES AS A FUNCTION OF THREAD INTERFERENCE

| | Taper (%) | | Thread interference (mm) | | Contact pressure/ |
|---|---|---|---|---|---|
| | Male | Female | First male thread side | Last male thread side | SMYS ratio |
| 1st case | 6.00% | 6.60% | −0.48 mm | 0.19 mm | 0.74 |
| 2nd case | 6.50% | 6.10% | 0.30 mm | −0.15 mm | 0.59 |

The deleterious effect of a positive diametrical interference on the side of the first male threads on the contact pressure at the sealing surfaces 5, 6 can be seen. It thus appears to be judicious to be able to estimate the diametrical interference on the start side of the male thread and in particular in the plane corresponding to the last perfect female thread interacting with the first perfect male thread. Measurement of the pitch diameter of the threads in this region would appear to be an advantageous consequence.

However, even when forming the connection with the mean distinct values of the taper and by controlling the pitch diameter relatively close to the sealing surfaces using the method of the invention, for certain male/female element pairs accepted by the inspection method of the invention, the value of the thread interference close to the bearing surfaces 5, 6 may be higher than the maximum value of the thread interference at the same region for threads inspected by hard gauges using the API 5B specification.

This point can be verified by geometrical calculation.

In the case of the pipes given in the above example, taking into account the admissible tolerances for the tapers, it is found that the maximum value of the thread interference close to the sealing surfaces in the case of the inspection method of the invention is 0.07 mm less than the maximum value of the thread interference at the same location for the threads inspected using specification API 5B.

Such a result is satisfactory. It that was not the case, in order for there to be a strict equivalence of the methods, it would be suitable, for example, to reduce the tolerance range for the taper of the threads produced and inspected using the method of the invention.

A final verification to be carried out concerning the equivalence of inspection with specification API 5B is the equivalence of the makeup torques.

The makeup torque at the moment when the bearing surfaces 7, 8 come into contact is essentially a function of the global interference on the whole of the threads.

While the value of the thread interference close to the sealing surfaces 5, 6 is well under control by using the method of the invention, the value of the interference at the other end of the thread, i.e., at the level of the imperfect male threads, is in contrast more poorly controlled.

Thus the inventors have confirmed that the makeup torque has not to be modified while the value of the thread interference area, calculated for the mean dimensions of the male/female elements 1, 2 and integrating the value of the interference all along the thread, is little different for the threads inspected using the method of the invention and the threads inspected using specification API 5B.

In the case of the pipes given in the preceding example, the value of this thread interference area is 2% lower for the method of the invention with respect to inspection using specification API 5B; such a difference is entirely acceptable.

If a large difference were to be found, for example more than 30% in one or other direction, it would be suitable here again, for example, to reduce the limits of the tolerance range for the thread tapers.

The present invention is not limited to the embodiments described in the Figures or examples.

The invention can be applied to inspecting tapered threads of integral connections, each pipe being a long pipe and being provided with a male element 1 at one end and a female element 2 at the other end, the male element of a first pipe 101 being connected to the female element 2 of a second pipe 102.

It can also be applied to inspecting the tapered threads of coupled connections between long pipes provided with a male element 1 at each end, the couplings for connection being provided at each end with a female element 2.

It can also be applied to inspection of tapered threads with any thread form: round, triangular, trapezoidal with positively or negatively angled flanks, etc.

What is claimed is:

1. A method for inspecting a male tapered thread located on an external periphery of a male element itself located at the end of a metal pipe and comprising at least one sealing means located close to said end, in which a pitch diameter of the thread is inspected in a given measuring plane located at a distance $L_1$ from a reference plane of a drawing using a plane diameter measuring device which comprises a bearing surface, at least two contact surfaces a transverse distance from each other and at an adjustable axial distance from the bearing surface and a means for measuring a diameter of a circle located in a transverse measuring plane tangential to the contact surfaces, said method comprising the following steps:

a) on the plane diameter measuring device, adjusting the distance between the bearing surface and the measuring plane as a function of the distance $L_1$ selected;

b) adjusting said measuring means to a pre-determined value for the transverse distance between the contact surfaces using a setting block the characteristic dimension of which is defined with respect to the estimated value of the pitch diameter $D_{1e}$ in the measuring plane;

c) measuring, in the measuring plane, the diameter of the thread between thread crests, the bearing surface of the measuring device being abutted against a free end of the male element;

d) comparing the measured diameter between the thread crests with the admissible limits of the range;

and wherein the measuring plane of the pitch diameter of the male thread is a plane located between the reference plane of the drawing and a first perfect male thread and wherein the estimated value of the pitch diameter in the measuring plane satisfies the following equations:

$$D_{1e} = D_{nom} - L_1 \cdot TT_{rep1}/100$$

$$TT_{rep1} = TT_{nom} + K_1 \cdot \Delta TT_1 + \frac{K_1 \cdot \sigma_1}{\sqrt{2\pi}} \cdot \exp\left[-\frac{1}{2} \cdot (\Delta TT_1/\sigma_1)^2\right] - K_1 \cdot \Delta TT_1 \cdot g(-\Delta TT_1/\sigma_1)$$

$D_{nom}$ being a nominal value of the pitch diameter in the reference plane;

$TT_{rep}$ being a plot value for the male taper;

$TT_{nom}$ being a nominal value of the taper of the thread;

$TT_{min1}$, $TT_{max1}$ and $TT_{av1}$ being respectively minimum, maximum and mean values of the taper of the threads produced;

$\Delta TT_1$ being an algebraic value of the difference $(TT_{av1} - TT_{nom})$;

$\sigma_1$ being a standard deviation of the distribution of the tapers produced;

$K_1$ being a ratio of the length of the male thread to the distance between the reference plane and the first perfect male thread;

$g(u)$ being a value of the reduced centred normal distribution for the value u of the variable.

2. An inspection method according to claim 1, wherein the measuring plane is located substantially half way between the reference plane and the plane corresponding to the first perfect male thread.

3. A method for inspecting a female tapered thread located on an internal periphery of a female element itself located at the end of a metal pipe and comprising at least one sealing means located so as to co-operate with at least one sealing means located close to the free end of the male element, in which the pitch diameter of the thread is inspected in a given measuring plane located at a distance $L_2$ from the reference plane of the drawing using a plane diameter measuring device which comprises a bearing surface, at least two contact surfaces a transverse distance from each other and at an adjustable axial distance from said bearing surface and a means for measuring the diameter of a circle located in a transverse measuring plane tangential to the contact surfaces, said method comprising the following steps:

a) on the plane diameter measuring device adjusting the distance $L_B$ between the bearing surface and the measuring plane as a function of the distance $L_2$ selected;

b) adjusting said measuring means to a pre-determined value for the transverse distance between the contact surfaces using a setting block the characteristic dimension of which is defined with respect to the estimated value $D_{2e}$ of the pitch diameter in the measuring plane;

c) measuring, in the measuring plane, the diameter of the thread between thread crests, the bearing surface of the measuring device being abutted against a free end of the female element;

d) comparing the measured diameter between the thread crests with the admissible limits of the range;

and wherein the measuring plane of the pitch diameter of the female thread is located in a zone of perfect female threads and is the closest to the plane of the drawing coinciding with the measuring plane of the pitch diameter of the male thread defined in claim 1 when, on the drawing, the two male and female threads are connected and wherein the estimated value of the pitch diameter in the measuring plane satisfies the following equations:

$$D_{2e} = D_{nom} - L_2 \cdot TT_{rep2}/100$$

$$TT_{rep2} = TT_{nom} + K_2 \cdot \Delta TT_2 - \frac{K_2 \cdot \sigma_2}{\sqrt{2\pi}} \cdot \exp\left[-\frac{1}{2} \cdot (\Delta TT_2/\sigma_2)^2\right] - K_2 \cdot \Delta TT_2 \cdot g(\Delta TT_2/\sigma_2)$$

$D_{nom}$ being a nominal value of the pitch diameter in the reference plane;

$TT_{rep2}$ being a plot value of the taper;

$TT_{nom}$ being a nominal value of the taper of the thread;

$TT_{min2}$, $TT_{max2}$ and $TT_{av2}$ being respectively minimum, maximum and mean values of the taper of the threads produced;

$\Delta TT_2$ being an algebraic value of the difference $(TT_{av2} - TT_{nom})$;

$\sigma_2$ being a standard deviation of the distribution of the tapers produced;

$K_2$ being a ratio of the length of the female thread to the distance between the reference plane and a last perfect female thread;

$g(u)$ being a value of the reduced centred normal distribution for the value u of the variable.

4. An inspection method according to claim 1, wherein the sealing means comprise a sealing surface.

5. An inspection method according to claim 1, wherein the sealing means comprise a transverse bearing surface.

6. A method for inspecting a female tapered thread according to claim 3, wherein the mean value of the taper of the female thread is less than the mean value of the taper of the male thread associated therewith.

7. A method for inspecting a male tapered thread according to claim 1, wherein the mean value of the taper of the male thread is higher than the nominal value.

8. A method for inspecting a female tapered thread according to claim 3, wherein the mean value of the taper of the female thread is lower than the nominal value.

9. An inspection method according to claim 1, wherein the values of the limits for the admissible range for the diameter between the thread crests are obtained by replacing, in the formula giving the estimated value of the pitch diameter in the measuring plane, the value of the distance between the reference plane and the measuring plane by the values which encompass it.

10. An inspection method according to claim 1, wherein said method is carried out, using a plane diameter measuring device which comprises two contact surfaces, four times in the same measuring plane by turning the measuring device or the thread by an eighth of a turn about the axis of the thread between each measurement and wherein the mean value of these four measurements is used to characterize the diameter between the crests of the threads in the measuring plane.

11. An inspection method according to claim 1, wherein said method is carried out, using a plane diameter measuring device which comprises three contact surfaces, three times in the same measuring plane by turning the measuring device or the thread by 40° about the axis of the thread between each measurement and wherein the mean value of these three measurements is used to characterize the diameter between the crests of the threads in the measuring plane.

12. Application of the inspection method according to claim 1 to inspecting tapered threads of male and female elements of a threaded connection, wherein said threaded connection is an integral connection, each pipe being a long pipe and being provided with a male element at one end and a female element at the other end, the male element of a first pipe being connected to the female element of a second pipe.

13. Application of the inspection method according to claim 1 to inspecting tapered threads of male and female elements of a threaded connection, wherein said threaded connection is a coupled connection, the long pipes to be connected being provided with a male element at each end and the couplings being provided at each end with a female element.

14. A plane diameter measuring device for carrying out the inspection method according to claim 1, comprising two contact surfaces, and a means for automatic acquisition of the maximum value obtained during measurement.

15. A plane diameter measuring device for carrying out the inspection method according to claim 1, comprising a means for carrying out statistical calculations on the values acquired for the diameter between the thread crests.

16. A setting block used to adjust the pre-determined value of the distance between the two contact surfaces in the inspection method according to claim 1, wherein the block is in the form of a truncated wedge and comprises a transverse end surface and two substantially longitudinally orientated flat faces, inclined symmetrically with respect to the transverse end surface and converging towards the latter, an angle C between said flat faces being equal to $2.\arc \tan(TT_{av1}/2)$ and the transverse distance between said inclined flat faces being equal to $(D_{1e}+h)$ at the longitudinal distance from the end surface, h being equal to the sum of the height of one tooth of the thread to be inspected and a geometrical correction factor.

17. A setting block used to adjust the pre-determined value of the distance between the three contact surfaces in the inspection method according to claim 1, wherein the block is in the form of a truncated cone and comprises a transverse end surface on a vertex side of the cone and a tapered peripheral surface with a taper equal to $TT_{av1}$, the diameter of the tapered surface at the distance from the transverse end surface being equal to $(D_{e1}+h)$, h being equal to the sum of the height of one tooth of the thread to be inspected and a geometrical correction factor.

18. A setting block according to claim 16, wherein the setting block comprises, at the end of its inclined flat faces or of its tapered peripheral surface on the end surface side, a portion with a different slope or taper which reproduces the profile of at least one sealing means of the male element.

19. A setting block used to adjust the pre-determined value of the distance between the two contact surfaces in the inspection method according to claim 3, wherein the block has a transverse end surface and an internal space delimited by two flat surfaces of the block, with a substantially longitudinal orientation, symmetrically inclined with respect to said end surface and converging towards the back of the internal space, an angle D between said inclined flat faces being equal to $2.\arc \tan(TT_{av2}/2)$ and the transverse distance between said inclined flat faces being equal to $(D_{2e}-h)$ at the longitudinal distance from the end surface, h being equal to the sum of the height of one tooth of the thread to be inspected and a geometrical correction factor.

20. A setting block used to adjust the pre-determined value of the distance between the three contact surfaces in the inspection method according to claim 3, wherein the block has a transverse end surface and an internal space delimited by a tapered peripheral surface with a longitudinal axis and with a taper equal to $TT_{av2}$, a vertex of which is directed to the side opposite to the transverse end surface and in which the diameter at the distance from the transverse end surface is equal to $(D_{2e}-h)$, h being equal to the sum of the height of a tooth of the thread to be inspected and a geometrical correction factor.

21. A setting block according to claim 19, wherein the block comprises, at the end of its inclined flat faces or of its tapered peripheral surface on the side opposite to the transverse end surface, a portion with a different slope or taper which reproduces the profile of the at least one sealing means of the female element.

* * * * *